United States Patent
Kato

[11] Patent Number: 5,083,073
[45] Date of Patent: Jan. 21, 1992

[54] METHOD AND APPARATUS FOR CALIBRATING A VISION GUIDED ROBOT

[75] Inventor: Hideyuki Kato, Monroe, Mich.

[73] Assignee: Mazada Motor Manufacturing U.S.A. Corp., Flat Rock, Mich.

[21] Appl. No.: 585,546

[22] Filed: Sep. 20, 1990

[51] Int. Cl.$^5$ ............................................. G05B 19/42
[52] U.S. Cl. ............................... 318/577; 318/573; 318/574; 318/568.13; 901/42; 395/1
[58] Field of Search ............................... 318/560–646; 901/42, 9; 364/513, 474.08; 356/375, 376, 372, 369; 358/101

[56] References Cited

U.S. PATENT DOCUMENTS

| | | | |
|---|---|---|---|
| 4,380,696 | 4/1983 | Masaki | 318/568 X |
| 4,547,800 | 10/1985 | Masaki | 358/101 |
| 4,663,726 | 5/1987 | Chand et al. | 318/573 X |
| 4,675,502 | 6/1987 | Haefner et al. | 318/514 |
| 4,761,596 | 8/1988 | Nio et al. | 318/568 |
| 4,831,232 | 5/1989 | Anderson et al. | 318/577 X |
| 4,831,316 | 5/1989 | Ishiguro et al. | 318/568.13 |
| 4,833,381 | 5/1989 | Taft et al. | 318/577 |
| 4,843,287 | 6/1989 | Taft | 318/568.16 |
| 4,945,493 | 7/1990 | Huang et al. | 318/568.19 X |
| 4,952,772 | 8/1990 | Zana | 318/577 X |

FOREIGN PATENT DOCUMENTS 63128215  11/1961  Japan .
1242906  3/1963  Japan .

*Primary Examiner*—Paul Ip
*Attorney, Agent, or Firm*—Thompson, Hine and Flory

[57] ABSTRACT

A method and apparatus for calibrating a vision-guided robot of the type having a slit light unit for illuminating a workpiece with a target image, a camera for detecting the target image, a tool for working upon the workpiece and a controller for positioning the tool in response to image signals from the camera so that the camera signals correspond to stored image signals. The method includes the steps of displacing the robot from a home position to a calibration position wherein the camera is oriented toward a target, determining a camera correction value between a desired camera position and the actual camera position by comparing a perceived target image with a stored target image and incorporating the camera correction value for robot positioning during a subsequent operational movement. The method also includes a slit light calibration sequence in which the robot is displaced to a second calibration position where the slit light unit directs a light beam on a second target, the camera perceives a second target image and a light correction value between a desired slit light image and an actual slit light image is determined and incorporated for robot positioning during the subsequent operational movement. The calibration unit comprises topmost, intermediate and lower plates arranged in stairstep fashion, the topmost plate having a first pattern perceivable by the camera to enable the controller to determine spatial orientation of the plate and the intermediate and lower plates include a second pattern perceivable by the camera which enables the controller to determine the position of the slit light unit.

13 Claims, 4 Drawing Sheets

U.S. Patent     Jan. 21, 1992     Sheet 1 of 4     5,083,073

METHOD AND APPARATUS FOR CALIBRATING A VISION GUIDED ROBOT

BACKGROUND OF THE INVENTION

The present invention relates to vision-guided robots and, more particularly, to methods and apparatus for calibrating a vision-guided robot.

Manufacturing operations have now become automated to the point where robotic devices, without human supervision, perform many assembly functions which formerly were performed manually, or manually with a power tool. This evolution is evident in the assembly of automobiles, where, for example, robot devices perform welding operations and apply gasketing material to windshields. In applications where the workpiece may vary somewhat from a precise, predetermined location, it is necessary that the robot have the capability of detecting, with precision, the location where it is to perform an assembly operation.

To accomplish this, some robots are fitted with a camera and slit light projector, the latter component producing a target image on the workpiece which is perceived by the camera. A computer control compares the target image received by the camera with a stored target image and directs the tool carried by the robot to a precise location relative to the target image to perform an assembly operation.

With some designs, the tool is mounted at the end of an articulated robot arm, and this arm also carries the camera and slit light projector. In order for the assembly operation to be performed accurately, the spatial relationship between the camera, tool and slit light projector must be set and maintained.

Currently, such calibration requires the camera and slit light projector to be adjusted manually in spatial orientation relative to the tool. Such manual adjustment requires the positioning of the camera and slit light projector on the end of the robot arm to a precise, predetermined orientation.

Manual calibration is often accomplished by iterative trial and error techniques. Accordingly, there is a need for a method and apparatus for calibrating a vision-guided robot which eliminates the manual repositioning of the light and camera components.

SUMMARY OF THE INVENTION

The present invention is a method and apparatus for calibrating a vision-guided robot which eliminates the need for manual adjustment of the spatial orientation of the camera and the light units relative to the robot tool. Rather, a minor out-of-adjustment condition of either the camera or the light unit is incorporated into an error factor which is superimposed on the programmed pattern of robot movement. Accordingly, calibration may be performed on an automated basis without manual adjustment. The invention also includes a calibration unit having a plurality of target plates, each bearing an image which is viewed by the robot camera and compared with a stored image to determine the magnitude of and out-of-tolerance condition of the camera and slit light unit.

In the preferred embodiment of the invention, the calibration method includes the steps of positioning the robot arm at a first calibration position such that the camera views a target pattern, comparing the target pattern with a stored pattern, calculating a correction value M representing the difference between the programmed and actual positions of the camera, and incorporating the camera correction value M for robot positioning during a subsequent operational movement. Similarly, the method of calibrating the slit light unit includes the steps of displacing the robot to a second calibration position B+M so that the slit light unit directs a light beam on a second target and the camera receives a second target image, determining a light correction value N between a desired slit light image and an actual slit light image by comparing the perceived target image with a stored target image, and incorporating the light correction value N for robot positioning during a subsequent operational movement. Consequently, all subsequent positioning of the robot is offset from predetermined locations by a factor of M+N, where M represents sets of spatial coordinates $(x,y,z,\theta x, \theta y, \theta z)$ and N represents sets of spatial coordinates $(x,y,z)$, added to the programmed coordinates for each robot movement.

Consequently, calibration of the robot can occur merely by actuating the robot to perform the calibration method, thereby eliminating the need for repositioning of the spatial orientation of the camera or slit light unit.

Accordingly, it is an object of the present invention to provide a method of calibrating a vision-guided robot which is totally automatic in operation; a method of calibration in which manual adjustment of the calibrated components is eliminated; a method of calibration which is relatively quick to effect and which does not require dismantling the robot; and an apparatus for use with such a method which facilitates the calibration of the camera and slit light unit.

Other objects and advantages of the present invention will be apparent from the following description, the accompanying drawings and the appended claims.

DETAILED DESCRIPTION

Figure 1:
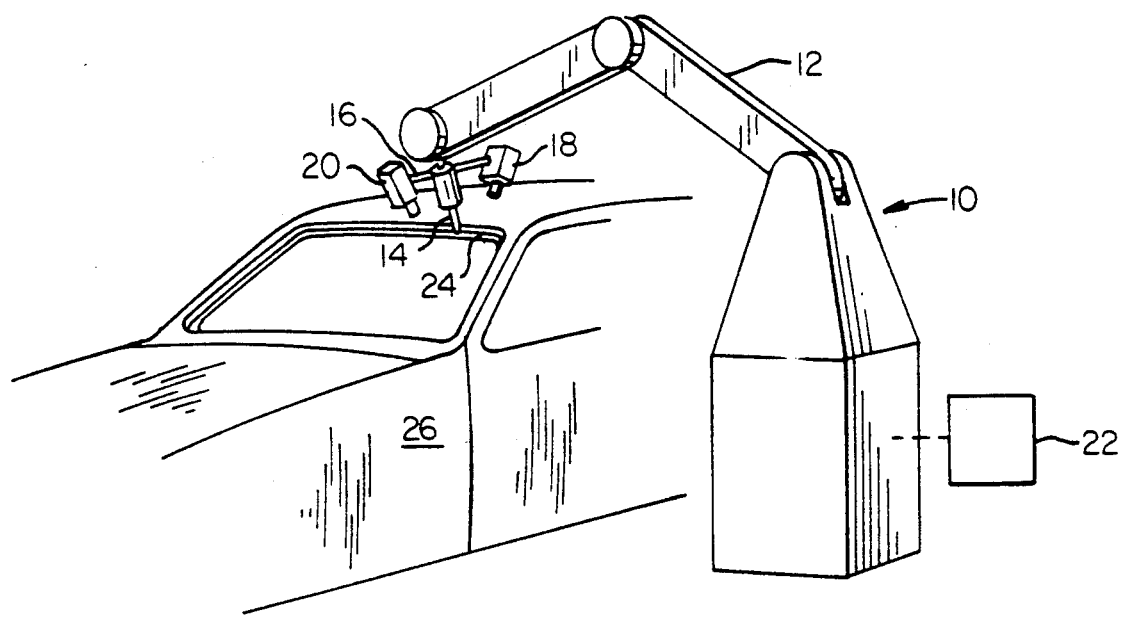
FIG. 1 is a schematic, perspective view showing a vision-guided robot of the type utilizing the method of the invention.
Figure 1A:
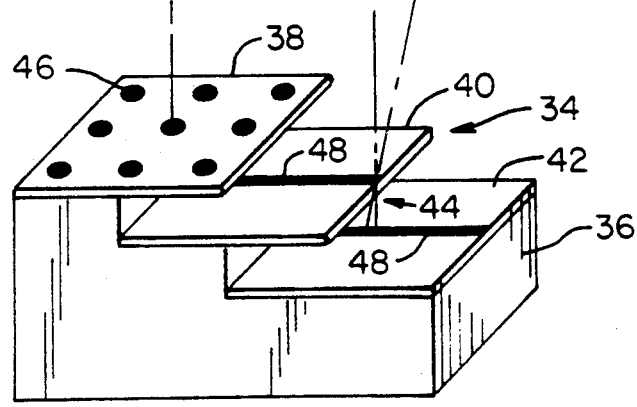
FIG. 1A is a detail of the vision-guided robot of FIG. 1, showing the slit light image projected upon a workpiece.

As shown in FIGS. 1 and 1A, the method and apparatus of the present invention preferably is used with a vision-guided robot, generally designated 10, having an articulated arm 12 and a tool, such as a gasketing material dispenser 14. The dispenser 14 is mounted at the end of the arm 12 and includes a support 16 which carries a camera 18 and slit light projector 20. The robot 10 incorporates a controller 22 which moves the arm 12 and dispenser 14 to lay a bead of gasketing material on the windshield seat 24 of an automobile body 26.

As shown in FIG. 1A, the slit light projector 20 projects a bar-shaped light pattern 28 on the windshield seat 24 which, as a result of the orientation of the projector, appears as two distinct image elements 29, 30. The control 22 is programmed such that the dispenser 14 lays the bead of gasketing material at a point P located at the end of image element 30. The dispenser 14 is actuated by the controller 22 to lay a bead in a C-shaped pattern around one-half the windshield seat. Another robot (not shown), identical to the robot described, is positioned on an opposite side of the automobile body on the assembly line and lays a complementary pattern of gasket material so that the entire windshield seat receives material.

Figure 2:
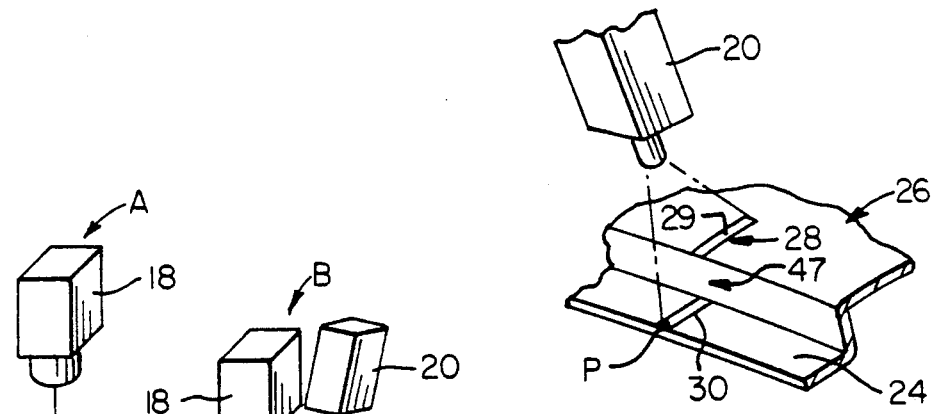
FIG. 2 is a perspective view of the calibration apparatus of the present invention, in which the robot camera of FIG. 1 is shown in two positions and in which the slit light projector is shown schematically.

As shown in FIG. 2, a calibration unit, generally designated 34, comprises a support 36, camera plate 38, and light plates 40, 42. Plates 38, 40 and 42 are arranged in stair step fashion, with the gap 44 between plates 40 and 42 being equivalent to the gap 47 (see FIG. 1A) between the components of image 28. Camera plate 38 includes a pattern of 9 black dots 46 spaced evenly on the plate against a contrasting light background. Plates 40, 42 include central stripes 48, also against a contrasting, light background.

Figure 3:
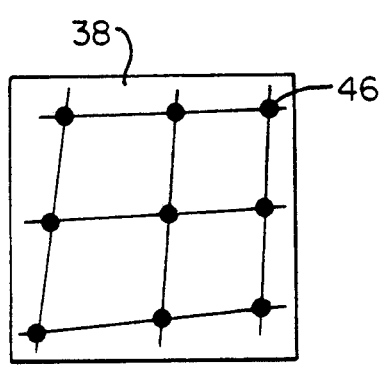
FIG. 3 is a top plan view of the topmost plate of FIG. 2, showing a pattern image perceived by a camera of the robot of FIG. 1 which is out of adjustment.

FIG. 3 shows the plate 38 and dots 46 in a pattern representative of a camera which is out of alignment with respect to the orientation of dispenser 14 (FIG. 1). Control 22 includes a stored image, such as that of plate 38 and pattern of dots 46 shown in FIG. 4, against which the pattern shown in FIG. 3 is compared.

Figure 5:
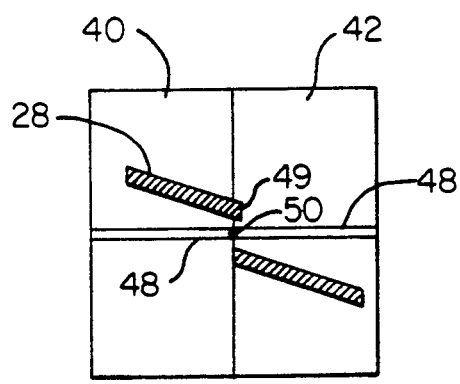
FIG. 5 is a top plan view of the intermediate and bottom plates of FIG. 2 showing a slit light image out of calibration.
Figure 6:
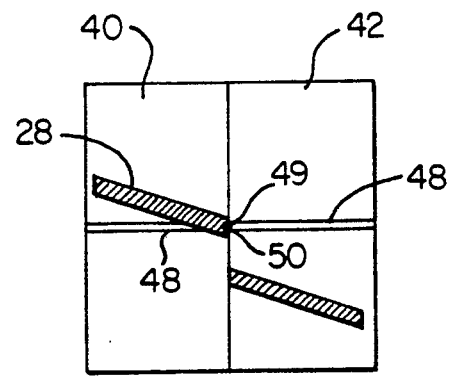
FIG. 6 is a top plan view of the plate of FIG. 5 after calibration.

Similarly, FIG. 5 shows plates 40 and 42 when viewed by camera 18 and projector 20, as shown in FIG. 2. The pattern 28 in FIG. 5 is shown out of calibration. As shown in FIG. 6, the end 49 of image 28 contacts point 50, indicating proper orientation of the slit light projector 20. In contrast, the out-of-calibration image 28 in FIG. 5 shows component 28 displaced so that end 49 is spaced from point 50.

Figure 7:
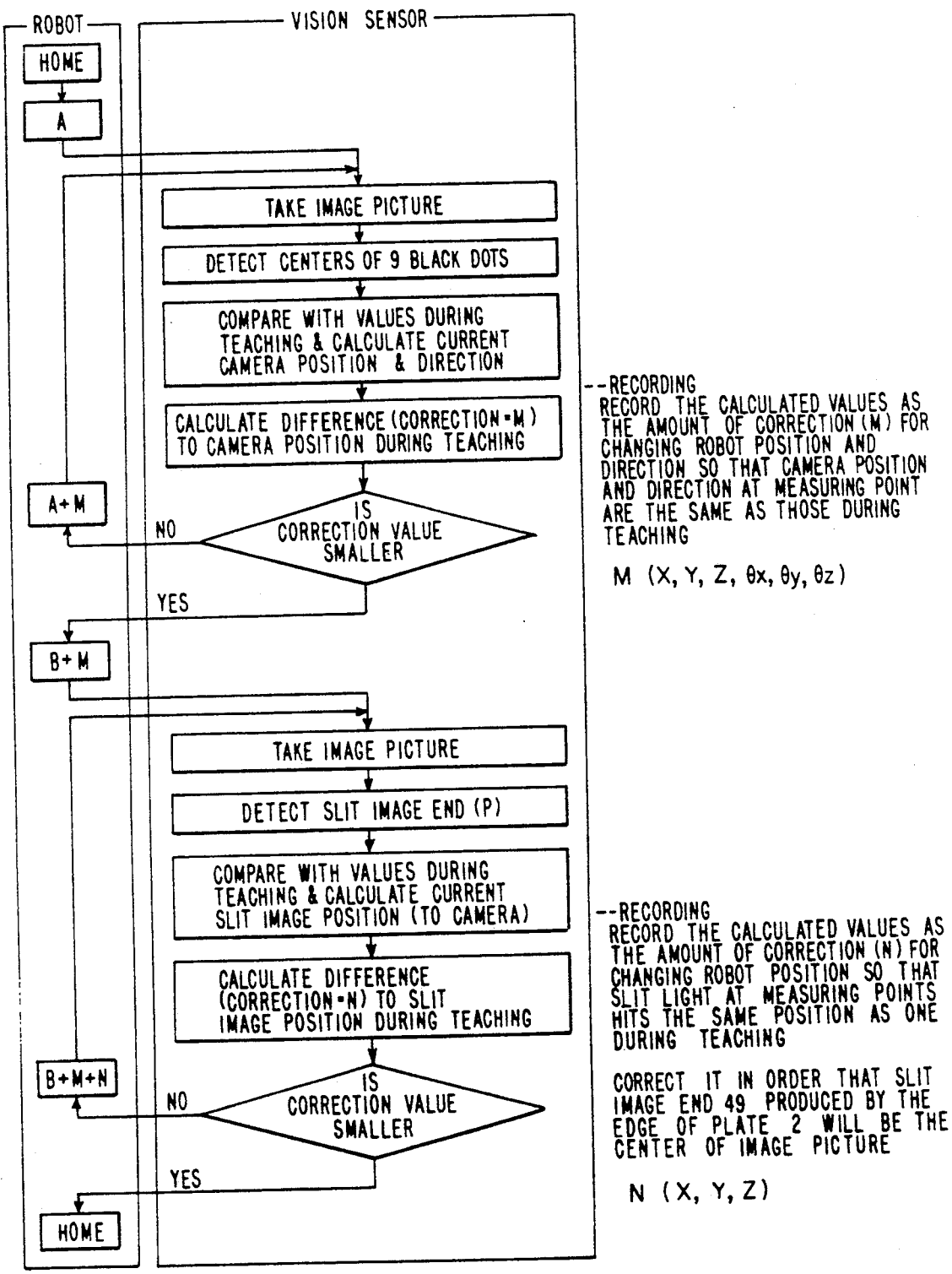
FIG. 7 is a flow chart showing the logic sequence in performing the calibration method.

The method of calibrating the camera 18 and slit light unit 20 is disclosed in FIG. 7. The robot 10 moves the arm 12 to displace the dispenser 14, camera 18 and light unit 20 from a home position to a first calibration position A shown in FIG. 2, so that the camera 18 views plate 38. The image received by the camera, for example the image of FIG. 3, is received by the camera and a signal sent to controller 22. This image is compared with a stored image, such as that shown in FIG. 4, and from the actual camera image the controller calculates the actual camera spatial position.

Figure 4:
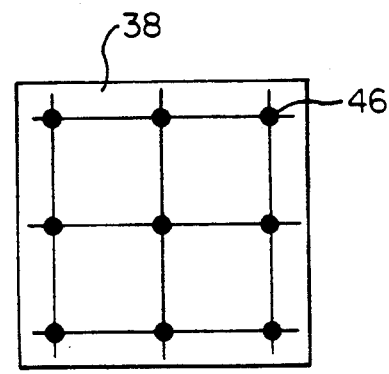
FIG. 4 is the plate of FIG. 3 after calibration of the camera.

The difference between the actual and desired position is calculated to yield a correction factor M, which is a function of the x, y, z, $\theta$ x, $\theta$ y, $\theta$ z coordinates which are added to the programmed coordinates for position A so that the perceived camera image will appear as in FIG. 4 when the correction factor M is added to the programmed coordinates for A.

As a check, the correction factor M is added to the coordinates for location A and the calibration procedure conducted a second time to generate a new value for a correction factor M'. A comparison is made to determine whether M' is smaller in magnitude than M. If so, the calibration procedure is operating correctly and the calibration procedure for the slit light can be conducted.

The arm 12 is moved to position the camera 18 and light unit 20 at second calibration position B, which is now modified to a position B+M. The image perceived, for example that shown in FIG. 5, is received by the control 22 which detects point 49 and calculates the current slit image position with respect to the desired slit image shown in FIG. 6. A correction factor N is calculated, which represents the difference between the desired and actual positions of the image 28 in FIGS. 6 and 5, respectively. Correction factor N is a function of x, y, z coordinates and is added to the programmed series of positions of the robot 10. As a check, the calibration procedure for the slit light 20 is conducted a second time to calculate a second correction factor N'. If the second correction factor N' is less in magnitude than the original factor N, the robot is calibrated with respect to the slit light unit 20.

Figure 8:
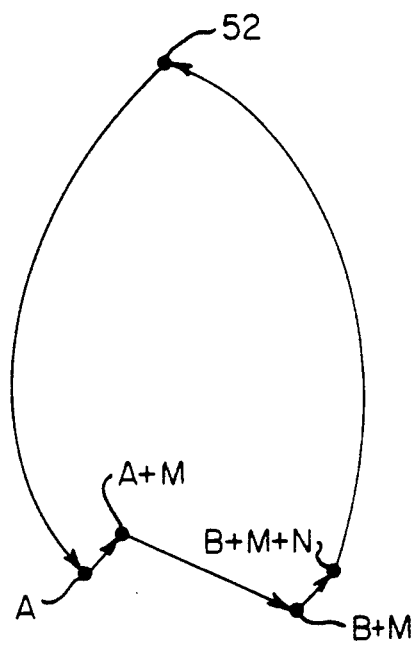
FIG. 8 is a schematic representation of robot arm movement during the calibration method of the present invention.

The movement of the robot arm 12 during the calibration method o the present invention is shown schematically in FIG. 8. Following a movement sequence stored in control 22 (FIG. 1), the arm begins at a home point 52 and moves to first calibration position A above calibration unit 34 (FIG. 2), where the control 22 calculates correction factor M. The arm is moved to place camera 18 at coordinates A+M; if desired, another calibration iteration can be performed. The arm 12 is then moved to second calibration position above unit 34, denoted B+M, and calibrated to determine N, so that a total calibration factor of M+N is incorporated into the movement sequence. The arm then returns to home position 52.

Figure 9:
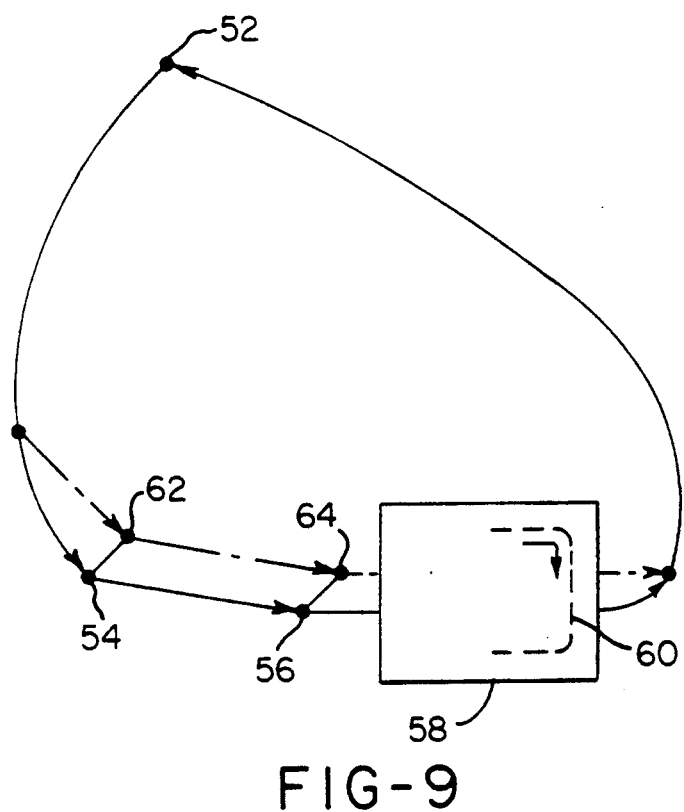
FIG. 9 is a schematic representation of robot arm movement during an operation after having been calibrated as in FIG. 8.

The movement of arm 12 during assembly operations shown in FIG. 9. Starting from home position 52, the arm normally would move through points 54, 56 which correspond to points on windshield seat 24 used to orient the robot 12 properly (see FIG. 1). The robot would then proceed to operation area 58 on the body 26 and lay a bead 60 of material.

However, after calibration as in FIG. 8, robot arm 12 moves to corrected points 62, 64 for orientation, then proceeds to work area 58 to lay bead 60, this time in a pattern which reflects the calibration adjustment incorporated into the programmed movement by the method of the invention. Arm 12 then performs the assembly operation, which in the preferred embodiment includes moving dispenser 14 in a C-shaped pattern to lay a bead of window gasketing material in windshield seat 24. After the operation is completed, the arm 12 returns to the home position. Accordingly, the entire calibration procedure is automatic, and does not require manual assistance. It is contemplated that this sequence need be performed only occasionally.

While the form of apparatus here and described constitutes a preferred embodiment of this invention, it is to be understood that the invention is not limited to this precise form of apparatus, and that changes may be made therein without departing from the scope of the invention.

I claim:

1. A method of calibrating a vision-guided robot of type having a slit light unit for illuminating a workpiece with a target image, a camera for detecting said target image, a tool for working upon said workpiece, and control means for positioning said tool in response to image signals from said camera such that said camera signals correspond to stored image signals, in order to compensate for out-of-alignment conditions of said light unit and said camera relative to said tool, comprising the steps of:

(a) displacing said robot to a first calibration position (A) wherein said camera is positioned at a predetermined orientation toward a first target and perceives a first target image;

(b) determining a camera correction value (M) between a desired camera spatial position relative to said tool and an actual camera spatial position relative to said tool by comparing said perceived first target image with a stored first target image; and (c) incorporating said camera correction value (M) in a stored sequence for robot tool positioning during a subsequent operational movement, thereby compensating for an out-of-alignment condition of said camera relative to said tool without actual adjustment of said camera.

2. The method of claim 1 further comprising the step of:

displacing said robot to a position (A+M), then proceeding with step (b) to determine a second camera correction value (M'); and comparing (M) and (M') to determine whether said camera correction value (M) is acceptable.

3. The method of claim 1 further comprising the steps of:

(d) displacing said robot to a second calibration position (B+M) wherein said slit light unit is positioned at a predetermined orientation to direct a light beam on a second target and said camera perceives a second target image;

(e) determining a light correction value (N) between a desired slit light spatial position relative to said tool and an actual slit light spatial position relative to said tool by comparing said perceived second target image with a stored second target image; and (f) incorporating said light correction value (N) in said operational sequence for robot tool positioning during a subsequent operational movement, thereby compensating for an out-of-alignment condition of said slit light unit relative to said tool without actual adjustment of said slit light unit.

4. The method of claim 3 further comprising the step of:

displacing said robot to a position (B+M+N) then proceeding with step (d) to determine a second light correction value (N); and comparing (N') and (N') to determine whether said light correction value (N) is acceptable.

5. The method of claim 2 further comprising the step of calibrating said robot with respect to said slit light unit if said (M') value is less in magnitude than said (M) value.

6. The method of claim 4 wherein said (N) comparing step includes the step of proceeding to a next operational step if said (N) value is greater than said (N') value.

7. The method claim 3 wherein said displacing step includes directing said slit light unit to illuminate a calibration plate having a stepped surface simulating a surface of said workpiece.

8. A calibration unit for use with a vision-guided robot of a type having a slit light unit for illuminating a workpiece with a target image, a camera for detecting said target image, a tool for working upon said workpiece, and control means for receiving image signals from said camera and positioning said tool in response to said image signals such that said image signals correspond to stored signals, the calibration unit comprising:

a topmost plate having a first pattern on an upper surface thereof perceivable by said camera, said pattern being shaped to enable said control means to determine spatial orientation of said plate relative to said camera;

intermediate and lower plates arranged in overlapping relation to each other and having reflective upper surfaces for receiving and reflecting said target image, each having a second pattern thereon perceivable by said camera and positioned to enable said control means to determine whether said slit light unit is centered on a predetermined point.

9. The unit of claim 8 further comprising base means for supporting said topmost, intermediate and lower plates.

10. The unit of claim 9 wherein said base means supports said plates in an overlapping, stepped relation.

11. The unit of claim 8 wherein said first pattern comprises three rows of three dots each on a lighter, contrasting background.

12. The unit of claim 8 wherrin said second pattern comprises a mark at an edge of said intermediate plate superposed to said lower plate.

13. The unit of claim 12 wherein said plates are oriented relative to each other such that said target image impinges on both of said intermediate and lower plates.

* * * * *

UNITED STATES PATENT AND TRADEMARK OFFICE
CERTIFICATE OF CORRECTION

PATENT NO. : 5,083,073
DATED : January 21, 1992
INVENTOR(S) : Hideyuki Kato

It is certified that error appears in the above-identified patent and that said Letters Patent is hereby corrected as shown below:

On the Title page, item [73]

Assignee: Delete "Mazada Motor Manufacturing U.S.A. Corp." and insert --Mazda Motor Manufacturing U.S.A. Corp.--

Column 6, line 4, delete "(N') [first occurrence] and insert --(N)--.

Signed and Sealed this

Eleventh Day of January, 1994

Attest:

BRUCE LEHMAN

Attesting Officer   Commissioner of Patents and Trademarks